(12) United States Patent
Saje et al.

(10) Patent No.: US 9,102,373 B2
(45) Date of Patent: Aug. 11, 2015

(54) HINGE PILLAR ASSEMBLY HAVING AN INNER RETAINER PANEL, AND METHOD OF MANUFACTURING THE SAME

(71) Applicant: GM GLOBAL TECHNOLOGY OPERATIONS LLC, Detroit, MI (US)

(72) Inventors: Robert N. Saje, Shelby Township, MI (US); Martin G. Foulkes, Howell, MI (US); William P. Ciaramitaro, Sterling Heights, MI (US); Jack E. Brown, Rochester Hills, MI (US); Michael W. Davenport, Clarkston, MI (US); Keith J. Saari, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/092,368

(22) Filed: Nov. 27, 2013

(65) Prior Publication Data
US 2015/0145286 A1  May 28, 2015

(51) Int. Cl.
| B62D 25/04 | (2006.01) |
| B62D 65/00 | (2006.01) |
| B62D 29/00 | (2006.01) |
| B22D 25/02 | (2006.01) |
| B22D 17/22 | (2006.01) |

(52) U.S. Cl.
CPC ............ *B62D 65/00* (2013.01); *B22D 17/2236* (2013.01); *B22D 25/02* (2013.01); *B62D 25/04* (2013.01); *B62D 29/002* (2013.01)

(58) Field of Classification Search
CPC ...... B62D 29/002; B62D 25/02; B62D 24/04; B22D 25/02; B22D 17/2236

USPC ................... 296/193.06, 39.3, 202
See application file for complete search history.

(56) References Cited

U.S. PATENT DOCUMENTS

| 5,273,309 | A | * | 12/1993 | Lau et al. .................. 280/730.2 |
| 6,003,274 | A | * | 12/1999 | Wycech .......................... 52/232 |
| 6,041,689 | A | * | 3/2000 | Lair et al. ................. 296/187.07 |
| 6,072,436 | A | * | 6/2000 | Marougi ....................... 343/713 |
| 6,419,305 | B1 | * | 7/2002 | Larsen ..................... 296/203.03 |
| 6,474,726 | B1 | * | 11/2002 | Hanakawa et al. ........... 296/191 |
| 6,474,977 | B1 | * | 11/2002 | Wimmer ....................... 425/556 |
| 7,628,445 | B2 | * | 12/2009 | Chen et al. ............... 296/193.06 |
| 7,926,867 | B2 | * | 4/2011 | Kochert et al. .......... 296/187.02 |
| 8,371,634 | B2 | * | 2/2013 | Hernandez Covarrubias ................. 296/39.3 |
| 2010/0247701 | A1 | * | 9/2010 | Sorimoto ..................... 425/236 |
| 2011/0020490 | A1 | * | 1/2011 | Starkey et al. ................ 425/556 |
| 2013/0241239 | A1 | * | 9/2013 | Mori ........................ 296/193.06 |
| 2013/0340968 | A1 | * | 12/2013 | Sugiura et al. ............... 164/131 |
| 2014/0265448 | A1 | * | 9/2014 | Bartlett et al. ........... 296/193.06 |
| 2015/0001884 | A1 | * | 1/2015 | Saje et al. ................ 296/193.06 |

\* cited by examiner

*Primary Examiner* — Pinel Romain
(74) *Attorney, Agent, or Firm* — Quinn Law Group, PLLC

(57) ABSTRACT

A hinge pillar assembly includes a hinge pillar panel that is cast from a die casting process, and that defines an interior surface. An acoustic foam layer is disposed adjacent the interior surface of the hinge pillar panel. An inner retainer panel is attached to the hinge pillar panel. The inner retainer panel secures the acoustic foam layer between the inner retainer panel and the hinge pillar panel. The hinge pillar assembly is cast to define a cored boss that is used to retain the hinge pillar panel within an upper ejector half of a die set during the casting process. A fastener is disposed in the threaded engagement with the cored boss to attach the inner retainer panel to the hinge pillar panel. A vehicle component may be attached to the inner retainer panel.

16 Claims, 3 Drawing Sheets

HINGE PILLAR ASSEMBLY HAVING AN INNER RETAINER PANEL, AND METHOD OF MANUFACTURING THE SAME

TECHNICAL FIELD

The invention generally relates to a method of manufacturing a hinge pillar assembly for a vehicle.

BACKGROUND

Vehicles often include a hinge pillar assembly that is attached to a support structure of a vehicle, i.e., a frame of the vehicle. The hinge pillar assembly provides one or more hinge attachment points for attaching door hinges to the vehicle. Accordingly, the hinge pillar assembly must be rigid enough to support a door thereon. Such a hinge pillar assembly may be manufactured from a pair of stamped metal panels, e.g., an inner stamped metal panel and an outer stamped metal panel. The inner stamped metal panel and the outer stamped metal panel are attached together, such as by welding, to form the hinge panel assembly.

SUMMARY

A method of manufacturing a hinge pillar assembly for a vehicle is provided. The method includes casting a hinge pillar panel to define a casting interlock feature disposed on an interior surface of the hinge pillar panel. An acoustic foam layer is positioned about the casting interlock feature, such that the casting interlock feature positions the acoustic foam layer relative to the hinge pillar panel. An inner retainer panel is attached to the hinge pillar panel. The acoustic foam layer is disposed between the interior surface of the hinge pillar panel and the inner retainer panel.

A hinge pillar assembly for attachment to a support structure of a vehicle is also provided. The hinge pillar assembly includes a hinge pillar panel that is cast from a die casting process, and that defines an interior surface. An acoustic foam layer is disposed adjacent the interior surface of the hinge pillar panel. An inner retainer panel is attached to the hinge pillar panel. The inner retainer panel secures the acoustic foam layer between the inner retainer panel and the hinge pillar panel.

Accordingly, the hinge pillar assembly includes only one metal panel, i.e., the hinge pillar panel, which is cast from a die casting process. The hinge pillar panel is cast with various casting features to provide the necessary rigidity and strength to support a door of the vehicle thereon. Because the cast hinge pillar panel provides all of the required rigidity and strength for the hinge pillar assembly, the hinge pillar assembly does not include an inner metal panel, which allows various vehicle components to be attached and/or supported by the hinge pillar panel. Additionally, because the hinge pillar assembly does not include an inner metal panel, the acoustic foam layer may be attached to the hinge pillar panel to reduce noise within the vehicle.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a hinge pillar assembly is generally shown at 20. The hinge pillar assembly 20 is configured for attachment to a support structure of a vehicle such as a frame or uni-body construction of a vehicle. The hinge pillar assembly 20 provides attachment locations for one or more hinges, which attach a door of the vehicle to the hinge pillar assembly 20.

Figure 1:
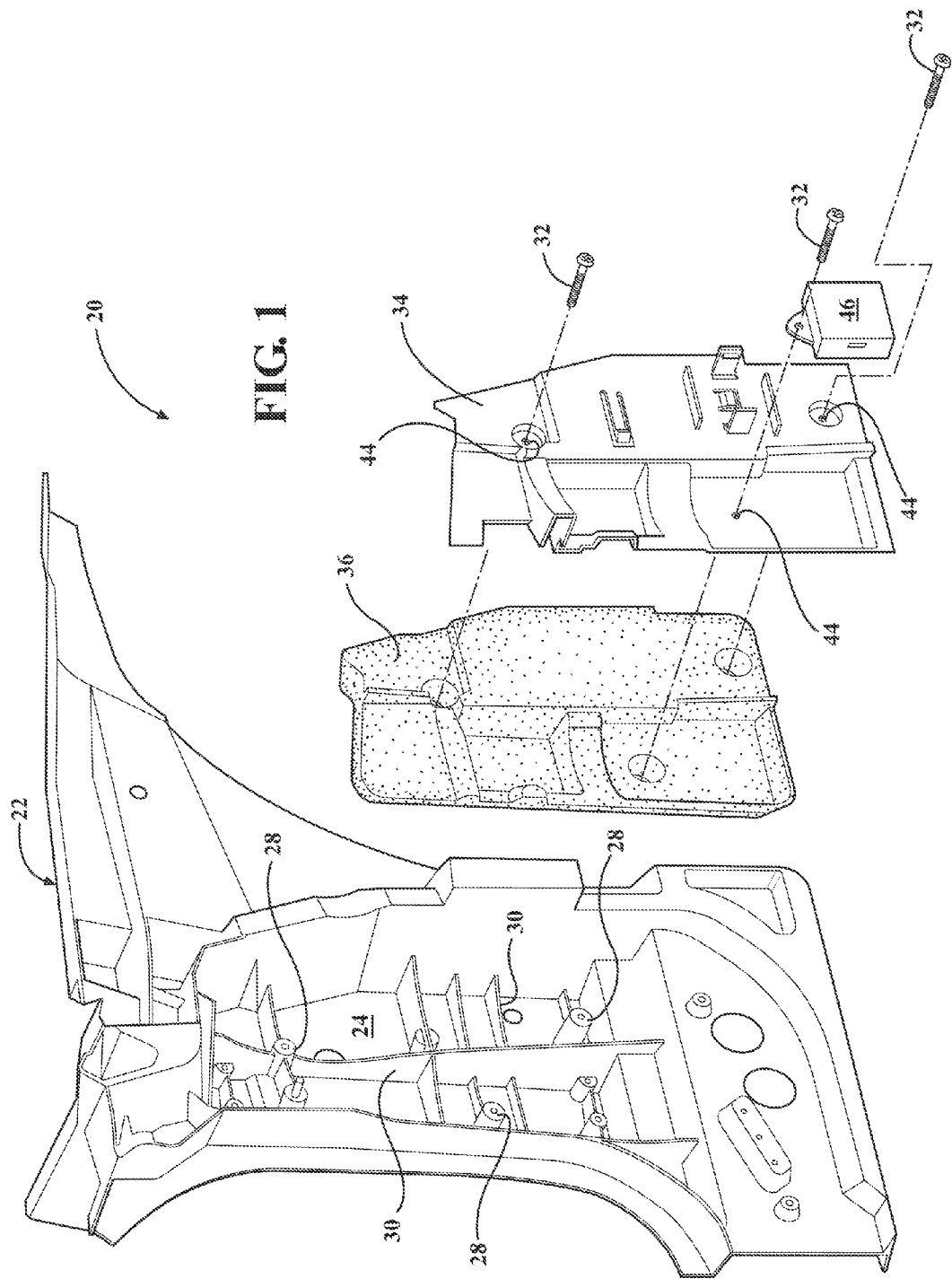
FIG. 1 is a schematic exploded perspective view of a hinge pillar assembly.

Referring to FIG. 1, the hinge pillar assembly 20 includes a hinge pillar panel 22. The hinge pillar panel 22 is cast from a die casting process. The hinge pillar panel 22 includes an inboard or interior surface 24, and an outboard or exterior surface 26, shown in FIG. 3. The interior surface 24 faces and is disposed nearer a longitudinal center of the vehicle than the exterior surface 26. The exterior surface 26 faces away from the longitudinal center of the vehicle.

The hinge pillar panel 22 is cast using a standard high pressure direct casting process known to those skilled in the casting arts. The high pressure direct casting process includes a die set having an upper ejector die half disposed vertically above a lower non-ejector die half. As is known in the art, when positioned adjacent each other, the upper ejector die half and the lower non-ejector die half form a cavity, which defines the shape of the hinge pillar panel 22. Molten metal is injected into the cavity, and allowed to cool, thereby forming the hinge pillar panel 22.

Figure 3:
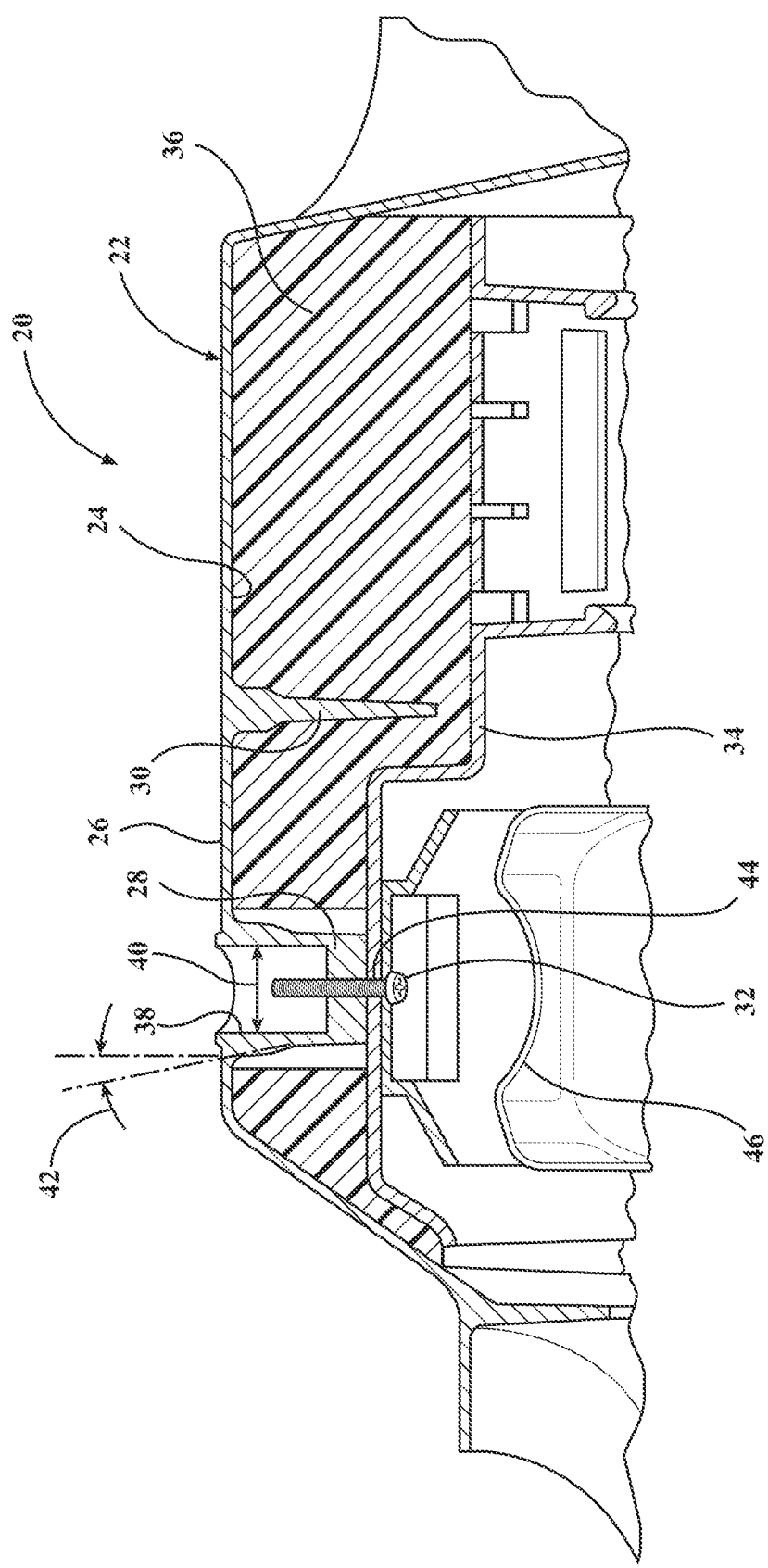
FIG. 3 is a schematic cross sectional view of the hinge pillar assembly.

Referring to FIGS. 1 and 3, the hinge pillar panel 22 is cast to define a casting interlock feature 28, 30 that is disposed on the interior surface 24 of the hinge pillar panel 22. The casting interlock feature 28, 30 may include, but is not limited to, a cored boss 28, or one or more ribs 30. Preferably, the hinge pillar panel 22 is cast to include a plurality of cored bosses 28, and a plurality of ribs 30, all disposed on the interior surface 24 of the hinge pillar panel 22. The cored bosses 28 may be used to retain the hinge pillar panel 22 within one of the halves of the die set, i.e., either the upper ejector die half or the lower ejector die half. Additionally, the cored bosses 28 are used to receive a fastener 32 to attach an inner retainer panel 34. The ribs 30 provide strength and rigidity to the hinge pillar panel 22. Together, the casting interlock features 28, 30 cooperate to position an acoustic foam layer 36 relative to the hinge pillar panel 22.

As noted above, the hinge pillar panel 22 is cast to include at least one cored boss 28. While only a single cored boss 28 is described in detail herein, it should be appreciated that the hinge pillar panel 22 preferably includes a plurality of identically configured cored bosses 28. The cored boss 28 is formed to define a hollow central region 38, i.e., a core that defines a diameter 40. The cored boss 28 is further formed to include a draft angle 42 that is operable to retain the hinge pillar panel 22 within one of the die halves, e.g., the upper ejector die half of the die set. Preferably, the draft angle 42 is approximately equal to 2 degrees. However, it should be appreciated that the draft angle 42 may differ from the exemplary value.

Referring to FIGS. 1 and 3, the acoustic foam layer 36 is disposed adjacent the interior surface 24 of the hinge pillar panel 22. The acoustic foam layer 36 is may include, but is not limited to, cotton fibers, fiberglass fibers, polypropylene fibers, polyester fibers, or a blend thereof. The acoustic foam layer 36 conforms to and mates with the interior surface 24 of the hinge pillar panel 22. Preferably, the acoustic foam layer 36 is pre-formed in a mold that is identically shaped to match the interior surface 24 of the hinge pillar panel 22. The acoustic foam layer 36 is then positioned adjacent the interior surface 24 of the hinge pillar panel 22, with the various casting interlock features 28, 30 engaging and supporting the acoustic foam layer 36. As such, the acoustic foam layer 36 may wrap around and/or cover the various casting interlock features 28, 30. The various casting interlock features 28, 30 position and/or orient the acoustic foam layer 36 relative to the hinge pillar panel 22. It should be appreciated that the acoustic foam layer 36 may be positioned adjacent the interior surface 24 of the hinge pillar panel 22 in some other manner, such as by directly spraying the acoustic foam material onto the interior surface 24 of the hinge pillar panel 22, and allowing the acoustic foam material to set and form the acoustic foam layer 36.

Figure 2:
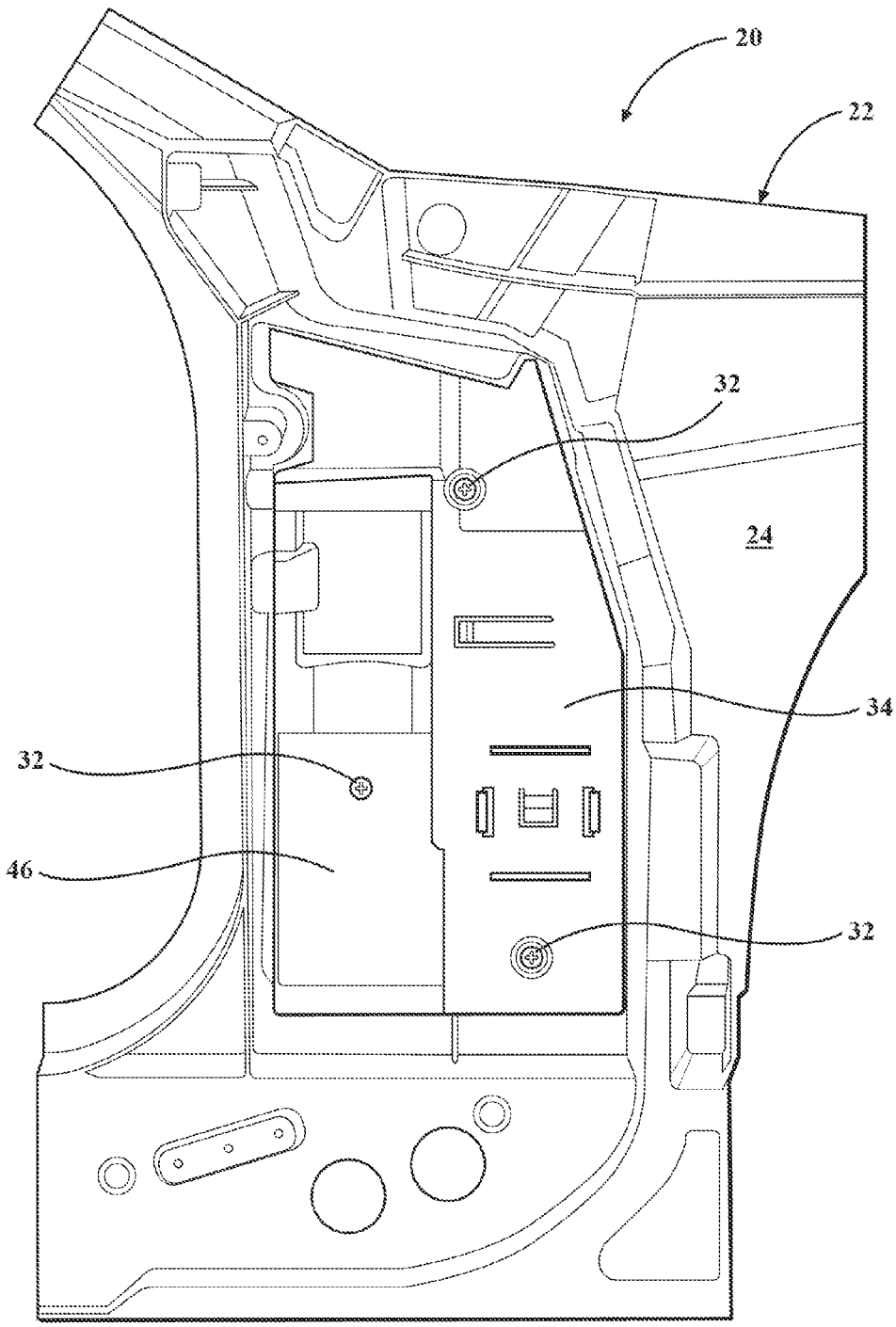
FIG. 2 is a schematic plan view from an interior side of the hinge pillar assembly.

Referring to FIGS. 1 through 3, the inner retainer panel 34 is attached to the hinge pillar panel 22, and secures the acoustic foam layer 36 between the inner retainer panel 34 and the hinge pillar panel 22. Preferably, the inner retainer panel 34 includes and is manufactured from a polymer, such as but not limited to talc filled polypropylene. The inner retainer panel 34 may be attached to the hinge pillar panel 22 in any suitable manner. Preferably, the inner retainer panel 34 is fastened to the hinge pillar panel 22 with the fastener 32, such as but not limited to a bolt or a screw, disposed in threaded engagement with the hinge pillar panel 22. For example, referring to FIG. 3, the fastener 32 may be inserted through an aperture 44 of the inner retainer panel 34, and into grasping engagement with the cored boss 28 of the hinge pillar panel 22. It should be appreciated that the diameter 40 of the central region 38 of the cored boss 28 is appropriately sized to receive the fastener 32 therein. If the fastener 32 includes a bolt or a screw, then grasping engagement may be defined as threaded engagement. However, it should be appreciated that the fastener 32 may include some other style of fastener 32, such as but not limited to a rivet or press pin, and grasping engagement may include some other form of engagement, such as but not limited to compressive engagement.

Preferably, the fastener 32 is disposed in threaded engagement with the cored boss 28 to attach the inner retainer panel 34 to the hinge pillar panel 22. As such, the cored boss 28 is not only used to retain the hinge pillar panel 22 within the upper ejector die half during the casting process, but is also used to thread the fastener 32 into, in order to attach the inner retainer panel 34 to the hinge pillar panel 22.

Referring to FIGS. 1 through 3, the hinge pillar assembly 20 may include a component 46 attached to and supported by the inner retainer panel 34. The component 46 may include, but is not limited to, one of an electrical module, an electrical connector, a wiring harness, or a trim piece. Preferably, the component 46 is attached to the inner retainer panel 34 by the fastener 32, which also attaches the inner retainer panel 34 to the hinge panel assembly. However, it should be appreciated that the component 46 may be attached to the inner retainer panel 34 in some other manner, or by another fastening device, not specifically shown or described herein.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of manufacturing a hinge pillar assembly for a vehicle, the method comprising:
    casting a hinge pillar panel with a high pressure direct casting process including a die set having an upper ejector die half disposed vertically above a lower non-ejector die half, to define a casting interlock feature disposed on an interior surface of the hinge pillar panel, wherein the interlock feature includes a cored boss;
    positioning an acoustic foam layer about the casting interlock feature such that the casting interlock feature positions the acoustic foam layer relative to the hinge pillar panel; and
    attaching an inner retainer panel to the hinge pillar panel by fastening the inner retainer panel to the hinge pillar panel with a fastener, with the acoustic foam layer disposed between the interior surface of the hinge pillar panel and the inner retainer panel.

2. The method as set forth in claim 1 further comprising forming the acoustic foam layer to conform to and mate with the interior surface of the hinge pillar panel.

3. The method as set forth in claim 1 wherein fastening the inner retainer panel to the hinge pillar panel includes inserting a fastener through an aperture of the inner retainer panel and into grasping engagement with the cored boss of the hinge pillar panel.

4. The method as set forth in claim 3 wherein inserting the fastener into grasping engagement with the cored boss of the hinge pillar panel is further defined as inserting the fastener into threaded engagement with the cored boss of the hinge pillar panel.

5. The method as set forth in claim 1 further comprising attaching a component to the inner retainer panel.

6. The method as set forth in claim 5 wherein the component includes one of an electrical module, an electrical connector, a wiring harness, or a trim piece.

7. The method as set forth in claim 5 wherein attaching the component to the inner retainer panel includes fastening the component to the inner retainer panel with a fastener that attaches the inner retainer panel to the hinge pillar panel.

8. The method as set forth in claim 1 further comprising retaining the hinge pillar panel on the upper ejector die half of the die set with the cored boss.

9. The method as set forth in claim 8 wherein casting the hinge pillar panel to define the cored boss includes forming the cored boss to include a draft angle operable to retain the cast hinge pillar panel within the upper ejector die half of the die set.

10. A hinge pillar assembly for attachment to a support structure of a vehicle, the hinge pillar assembly comprising:
    a hinge pillar panel cast from a die casting process, including a high pressure direct casting process, and defining an interior surface;
    an acoustic foam layer disposed adjacent the interior surface of the hinge pillar panel; and
    an inner retainer panel attached to the hinge pillar panel and securing the acoustic foam layer between the inner retainer panel and the hinge pillar panel.

11. The hinge pillar assembly as set forth in claim 10 wherein the hinge pillar panel includes a cored boss having a draft angle operable to retain the hinge pillar panel within an upper ejector die half of a die set.

12. The hinge pillar assembly as set forth in claim 11 further comprising a fastener in threaded engagement with the cored boss to attach the inner retainer panel to the hinge pillar panel.

13. The hinge pillar assembly as set forth in claim 11 wherein the acoustic foam layer conforms with and mates to the interior surface of the hinge pillar panel.

14. The hinge pillar assembly as set forth in claim 13 further comprising a component attached to and supported by the inner retainer panel.

15. The hinge pillar assembly as set forth in claim 10 wherein the hinge pillar panel includes at least one rib disposed on the interior surface thereof.

16. The hinge pillar assembly as set forth in claim 10 wherein the inner retainer panel is a polymer.

* * * * *